UNITED STATES PATENT OFFICE.

WILLIAM G. LINDSAY, OF NEWARK, NEW JERSEY, ASSIGNOR TO THE CELLULOID COMPANY, A CORPORATION OF NEW JERSEY.

PLASTIC COMPOSITION AND PROCESS.

1,199,800.  Specification of Letters Patent.  Patented Oct. 3, 1916.

No Drawing.  Application filed December 12, 1914.  Serial No. 876,806.

*To all whom it may concern:*

Be it known that I, WILLIAM G. LINDSAY, a citizen of the United States, residing at Newark, in the county of Essex and State of New Jersey, have invented certain new and useful Improvements in Plastic Compositions and Processes, of which the following is a full, clear, and exact specification.

This invention relates to cellulose compounds, such as compounds of acetyl cellulose or other cellulosic ester of a fatty acid, and to the process of making the same. The compounds are especially applicable for use as photographic films, or to any other use in which a compound of more or less plastic nature is desirable.

Photographic film having nitrocellulose as a base is objectionable because of its inflammable nature. To overcome this objection applicant has successfully employed a base of acetyl cellulose with triphenyl phosphate, as set forth in applicant's previous Letters Patent No. 1,050,065 and No. 1,067,785, and others.

The object of the present invention is to produce a film of this character which shall have a high degree of toughness, flexibility and durability. To attain such result it is of importance that certain peculiar solvent action shall be had upon the acetyl cellulose, and that the form of the acetyl cellulose structure resulting therefrom shall be preserved or maintained in the finished product.

In carrying out my invention, I use as a base that variety of acetyl cellulose or similar cellulosic ester which is soluble in acetone. The peculiar solvent action to which I have referred is secured primarily by the use of a volatile chlorinated hydrocarbon (chloroform, dichlorethylene, ethylene chlorid) in combination with either ethyl or methyl alcohol or both. The desired structure or physical form upon which the high degree of toughness, flexibility and durability is dependent is secured in the finished product, such as the film, by adding to the chlorinated hydrocarbon-alcohol combination solvent mixture, a relatively high-boiling liquid and a soluble solid substance before allowing the volatile constituents to evaporate. Such high-boiling liquid should be substantially insoluble in water and liquid at ordinary temperatures, such as 20° to 25° C., and when the product is intended for photographic purposes the high boiling liquid should not react with the chemicals used in photography. It should have a boiling point of 110° C. or higher, and should be miscible in all proportions with the chlorinated hydrocarbon-alcohol combination solvent, herein specified, as well as with the separate components thereof.

The solid substance should be substantially insoluble in water, but freely soluble in the chlorinated hydrocarbon-alcohol solvent, and when the product is intended for photographic purposes the solid substance should not react with the chemicals used in photography. Camphor, borneol, salol, diphenylamin, diacetanilid, triphenyl phosphate, or the like, may be used. I prefer triphenyl phosphate because, in addition to the foregoing properties, it imparts non-inflammability and other desirable properties to the resultant product.

I have found that the best proportion of alcohol, *i. e.*, ethyl or methyl alcohol, to be added to the chlorinated hydrocarbon solvent is from five to fifteen parts, although in practice I prefer the proportion of eleven parts of ethyl alcohol to eighty-nine parts by volume of the chlorinated hydrocarbon solvent.

A good proportion of high boiling liquid is from five to twenty-five parts to one hundred parts of cellulosic ester, and a good proportion of solid substance is from five to twenty parts to 100 parts of cellulosic ester.

While there will be an appreciable variation in the degree of flexibility imparted to the resultant compound according to the particular high boiling liquid used, nevertheless a high degree of flexibility and toughness will be attained by the use of any of the following: fusel oil, amyl butyrate, amyl salicylate, oil of aniseed, benzyl alcohol, benzyl acetate, benzyl benzoate, benzyl ether, benzoic ether, bornyl acetate, oil of camphor (heavy), carvene, oil of cedar leaves, oil of cedarwood, oil of cinnamon, aceto-dichlorhydrin and substituted derivatives of the chlorhydrins, ethyl sebacate, oil of eucalyptol, methyl salicylate, nitro-benzol, pentachlorethane, phenyl-ether, salicilate of benzyl, safrol, oil of sassafras, terpineol, amyl benzoate, amyl formate, oil of anise, anisic aldehyde, anisol, benzyl butyrate, benzyl formate, oil of camphor (light), carvol, cinnamylic alcohol, oil of citronella, oil of cloves, oil of eucalyptus, eugenol, ethyl cinnimate, oil of fennel, geraniol formate, geramyl acetate, oil of hedeoma, iso eugenol, iso-safrol, juniper berries (oil of), oil of mace, methyl cinnimate, methyl anthranilate, methylene acetate, methyl nitrobenzoate, methyl oleate, ethyl oleate, methyl phenyl acetate, methyl benzoate, ethyl benzoate, oil of nutmeg, olenthic ether, oil of pennyroyal, oil of peppermint, phenyl ethyl alcohol, oil of pine needles, oil of rosemary, oil of rue, oil of sage, oil of spike, oil of spruce, terpinyl acetate, oil of thyme. amylacetate. Also, these high boiling liquids may be used either alone or in combination. For instance, I have discovered that a small proportion of amyl acetate, say, from four to seven parts to one hundred parts of cellulosic ester will give good results in combination with 15 parts of fusel oil.

A good example for working purposes is as follows:—To 100 parts of cellulosic ester as herein specified I add a sufficient quantity of the chlorinated hydrocarbon-alcohol solvent to produce a fluid solution of whatever consistency may be desired. I then add the high boiling liquid and the soluble solid in the proportions herein specified. For instance, a good combination would be 15 parts of ethyl sebacate and 12½ parts of triphenyl phosphate. After a uniform and homogeneous solution has been made of these substances by stirring or other manipulative means, the mixture is then worked up for films or other products according to the means which are well known to the art.

The various novel chlorinated hydrocarbon solvents, solid substances and high boiling liquids severally or in combination not herein specifically claimed will form the subject of applications divisional hereof.

Having thus described my invention, I declare that what I claim as new and desire to secure by Letters Patent is:—

1. A composition of matter which consists of a solution of an acetone soluble acetyl cellulose, a high boiling liquid, and a solid substance, in a compound solvent consisting of a chlorinated hydrocarbon and an alcohol.

2. A composition of matter which consists of a solution of a soluble fatty acid ester of cellulose, a high boiling liquid, and a solid substance, in a compound solvent consisting of a chlorinated hydrocarbon and an alcohol.

3. A composition of matter which consists of a solution of an acetone soluble acetyl cellulose, a high boiling liquid, and a solid substance, in a compound solvent consisting of chloroform and an alcohol.

4. A composition of matter consisting of a dried solution of an acetone soluble acetyl cellulose, a solid substance and fusel oil in chloroform and alcohol.

5. A composition of matter consisting of a dried solution of an acetone soluble acetyl cellulose, a solid substance and a high boiling liquid in chloroform and alcohol.

6. A composition of matter consisting of a dried solution of an acetone soluble acetyl cellulose, fusel oil and triphenylphosphate in chloroform and alcohol.

7. A composition of matter consisting of a dried solution of an acetone soluble acetyl cellulose, a high boiling liquid and triphenyl phosphate in a chlorinated hydrocarbon-alcohol solvent.

8. A dried solution of approximately 100 parts of acetone soluble acetyl cellulose, five to twenty parts of a solid substance, and five to twenty-five parts of a high boiling liquid, in a compound solvent consisting of approximately 90 parts of a chlorinated hydrocarbon and 10 parts of an alcohol by volume.

9. The process which consists in dissolving an acetone soluble acetyl cellulose, a solid substance and a high boiling liquid in a chlorinated hydrocarbon-alcohol solvent, spreading such solution upon a surface and allowing it to dry and harden by evaporation.

10. The process which consists in dissolving an acetone soluble acetyl cellulose, a solid substance, and a high boiling liquid in a chlorinated hydrocarbon-alcohol solvent, spreading such solution upon a surface and allowing it to dry and harden by evaporation.

11. The process which consists in dissolving an acetone soluble acetyl cellulose, triphenyl phosphate and a high boiling liquid in a chlorinated, hydrocarbon-alcohol solvent, spreading such solution upon a surface and allowing it to dry and harden by evaporation.

12. The process which consists in dissolving an acetone soluble acetyl cellulose, triphenyl phosphate and fusel oil in chloroform and alcohol, spreading the solution upon a surface and allowing it to dry and harden by evaporation.

13. The process which consists in dissolving an acetone soluble acetyl cellulose, triphenyl phosphate and fusel oil in chloroform, alcohol and amylacetate, spreading the solution upon a surface and allowing it to dry and harden by evaporation.

14. A composition of matter which consists of a dried solution of an acetone soluble acetyl cellulose, triphenyl phosphate, chloroform, alcohol and fusel oil.

In testimony whereof I affix my signature, in presence of two witnesses.

WILLIAM G. LINDSAY.

Witnesses:
ADARENA PFEIFFER,
JESSIE MICKENS.